Dec. 3, 1968  H. B. EVANS  3,414,725
APPARATUS FOR THE DETERMINATION OF OPACITY TO RADIATION
PER UNIT OF THICKNESS OF OBJECTS
Filed Dec. 21, 1964  6 Sheets-Sheet 1

INVENTOR
HILTON B. EVANS
BY
ATTORNEY

INVENTOR
HILTON B. EVANS

Dec. 3, 1968 H. B. EVANS 3,414,725
APPARATUS FOR THE DETERMINATION OF OPACITY TO RADIATION
PER UNIT OF THICKNESS OF OBJECTS
Filed Dec. 21, 1964 6 Sheets-Sheet 5

INVENTOR
HILTON B. EVANS

ATTORNEY 3,414,725
APPARATUS FOR THE DETERMINATION OF OPACITY TO RADIATION PER UNIT OF THICKNESS OF OBJECTS
Hilton B. Evans, Littleton, Colo., assignor to Marathon Oil Company, Findlay, Ohio, a corporation of Ohio
Filed Dec. 21, 1964, Ser. No. 420,001
6 Claims. (Cl. 250—83.3)

ABSTRACT OF THE DISCLOSURE

The present invention comprises a radiation measuring device for determining opacity to radiation per unit of thickness of objects which may vary in thickness comprising in combination, means for projecting a relatively narrow beam of radiation through said objects, radiation measuring means for measuring the intensity of the radiation passing through said objects, measuring means for measuring the thickness of said objects at the points through which said radiation passes, computing means for compiling the outputs from said radiation detector and said thickness measuring device to directly indicate a variable which is dependent on the opacity to radiation per unit thickness of the object. Such determinations of unit opacity to radiation are particularly useful in the evaluation of geological specimens including those obtained by core drilling.

Summary of the invention

The preferred embodiments of the present invention comprise means for projecting a relatively narrow beam of radiation through objects and for measuring the intensity of the radiation passing through the objects, together with measuring means for determining the thickness of the objects at points through which the radiation passes and computing means for compiling the outputs from the radiation detector and the thickness measuring device to directly indicate the opacity to radiation per unit thickness of the object, or a variable which is dependent thereon.

The present invention relates to devices for the determination of physical properties of objects and in particular relates to devices for the determination of such physical properties as are proportional to the opacity to radiation per unit of thickness of the object.

In the field of geological exploration, it is frequently necessary to determine the density, or porosity of specimens and particularly of the cores obtained by core drilling with annular bits. Such cores are frequently of irregular thickness due to slanting of the drill bit, improper cutting, or shaving during the recovery process. Unless some correction is made for the variation in thickness, erroneous unit density determinations or unit porosity values will be obtained when the transmitted radiation is measured. Because of the large number of such determinations which must be made, the apparatus used should be simple to operate and preferably relatively automatic in order to minimize required operator training.

The devices of the present invention permit the rapid automatic determination of density and related physical properties with automatic correction for variations in sample thickness and without the need for skilled operators. In addition, the present invention permits the continuous determination of density and porosity at every point along an axis of the core specimen being examined. Such continuous graphing of specimen density is valuable in precise geological research, especially where such graphs are prepared on linear recorders having a chart speed identical with the speed of advancement of the specimen. In the latter cases, a 1:1 correlation between the length of the graph and the length of the specimen permits the graph to be correlated with the specimen by attaching the graph directly to the surface of the specimen.

Such continuous point by point determination of the opacity to radiation is also valuable in the examination of core samples and mineralogic specimens for the locations of veins of metallic ores or other deposits having high opacity to radiation. In such operations, the apparatus of the present invention may be equipped to signal wide variations in the transmission of radiation. Such signal may be audible or visible, or the variation may actuate an automatic marking device for marking the specimen at the point where the high opacity to radiation exists.

The invention may also be used to determine hidden internal voids or inclusions of materials highly transparent to radiation, as in metal specimens, polymeric foams, etc.

Figure 1:
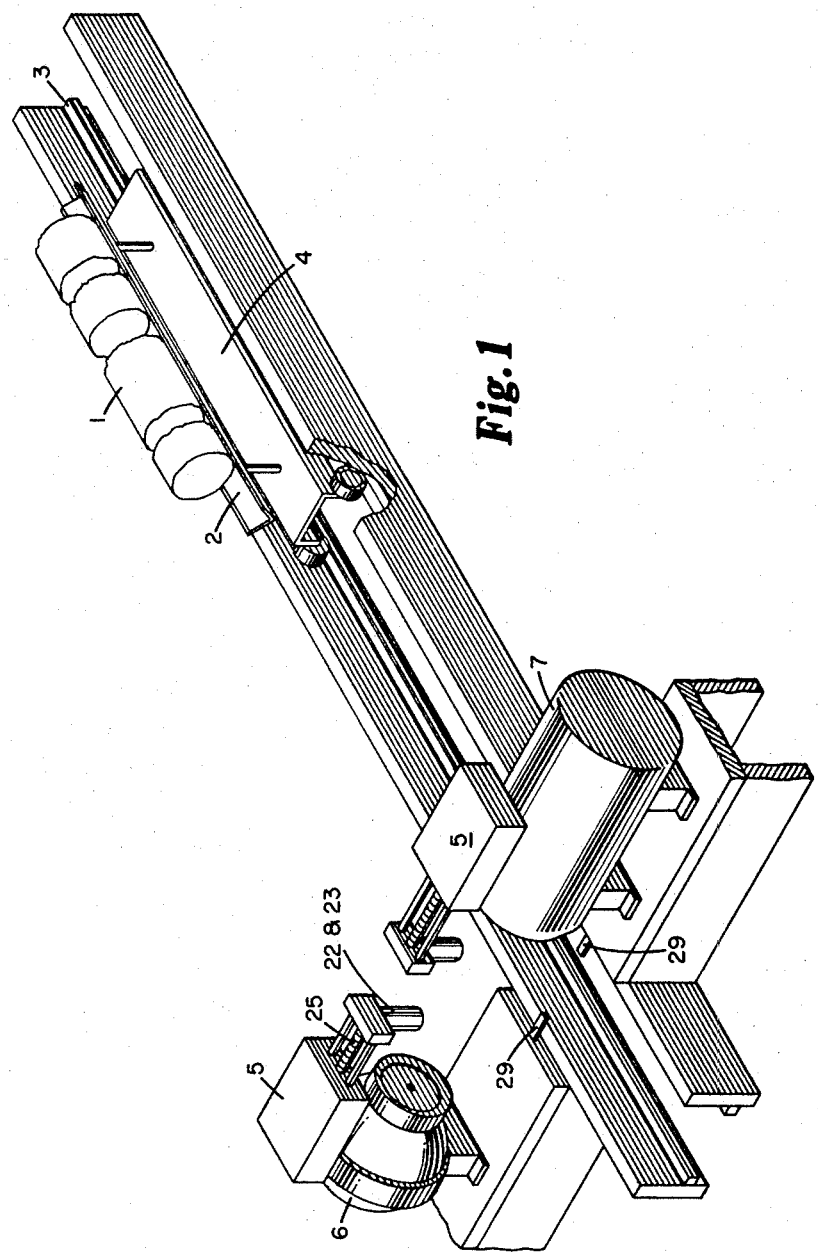
FIGURE 1 illustrates the mechanical components of a preferred embodiment of the present invention.

In FIGURE 1 a drill core 1 is carried in a carriage 2 which may have various holders to adapt it to fit cores which have been split longitudinally, flat specimens, tubes containing loose materials such as sand and various other shapes. The carriage is propelled along a track 3 by a drive mechanism 4 at a rate of about 0.1 to about 12 and preferably from 0.2 to about 5 inches per minute. The core passes between a shielded collimated gamma radiation source 6 having a beam width of 0.1 to about 2 inches and preferably from about ⅛ to ¼ inch and a collimated scintillation detector 7. The output from the scintillation detector 7 is electrically transmitted to a rate meter 8 which counts the number of pulses per unit of time and transmits a proportional signal through the computer 9 to one pen of a three-pen linear chart recorder operating at a chart feed rate identical with the rate of movement of the core along the track.

Figure 2:
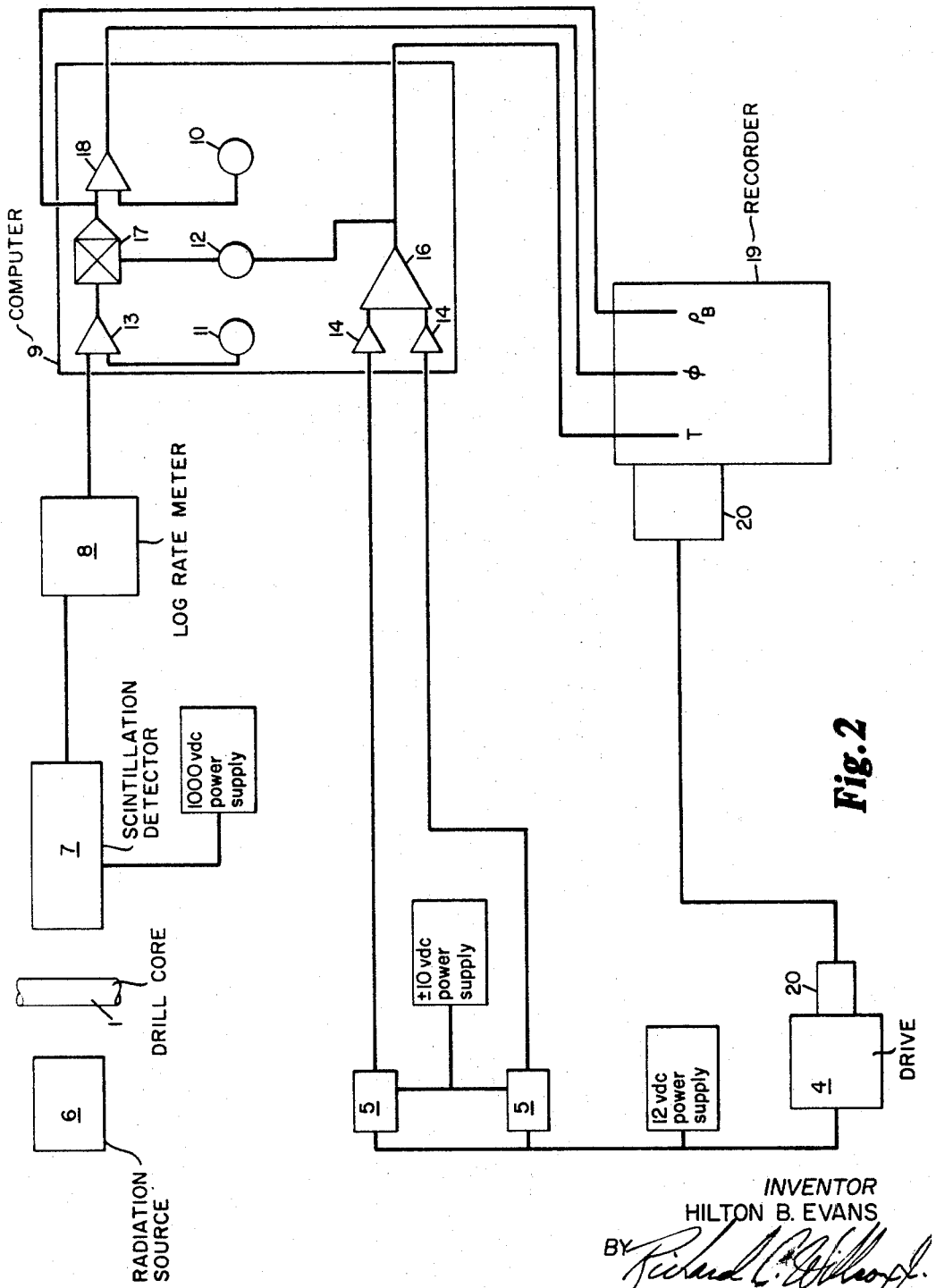
FIGURE 2 is a schematic electrical diagram illustrating the manner in which the major electrical components are connected in a preferred embodiment of the present invention.
Figure 3:
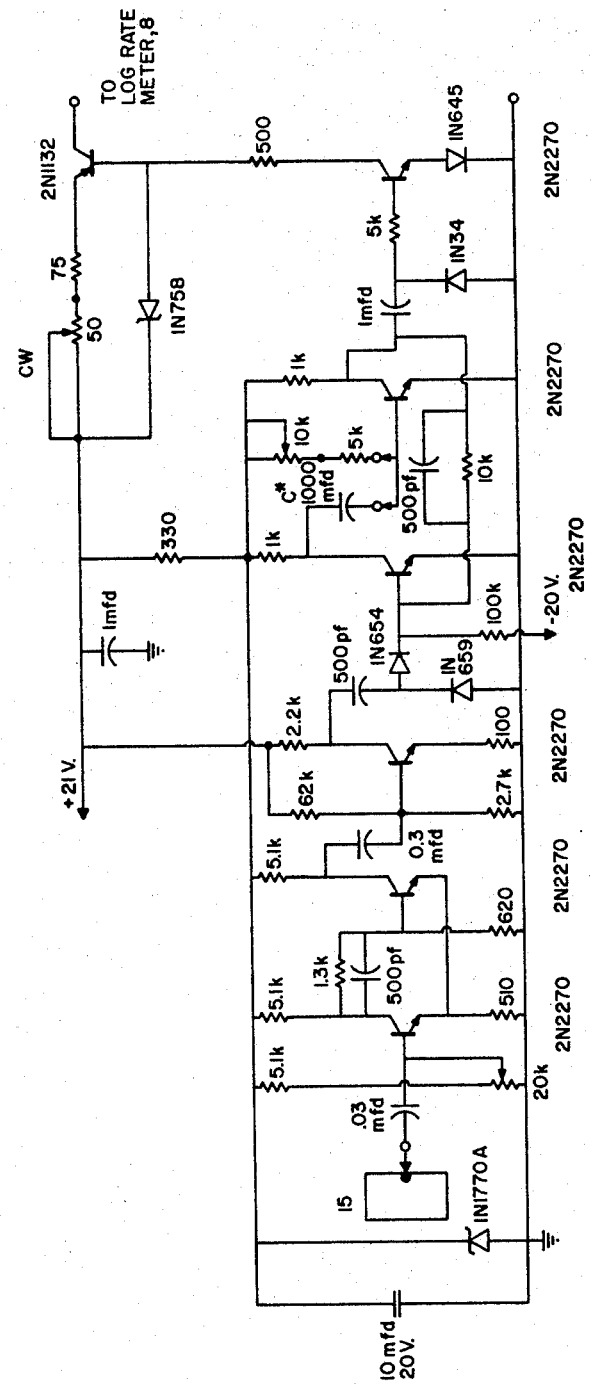
FIGURES 3 and 4 are circuit diagrams describing the circuitry of components of the preferred embodiment.

FIGURE 2 shows the connection of the scintillation detector 7 to the rate meter 8 and thence through the computer to the recorder. The circuitry of the scintillation detector 7, shown in FIGURE 3, utilizes a radiation detection crystal with integral preamplifiers such as the Model No. 658/2 manufactured by Harshaw Chemical Corporation, Cleveland, Ohio, and described in their brochure "NaI (TI) Mounted Scintillation Phosphors," dated Feb. 1, 1963. Alternatively, a type DS–12 transistorized Scintillation Detector Preamplifier (Technical Measurement Corp.) with RCA type 6655A photomultiplier tube and a Harshaw type 6D8F9 Crystal Ser. No. BF 324 may be employed.

Figure 4:
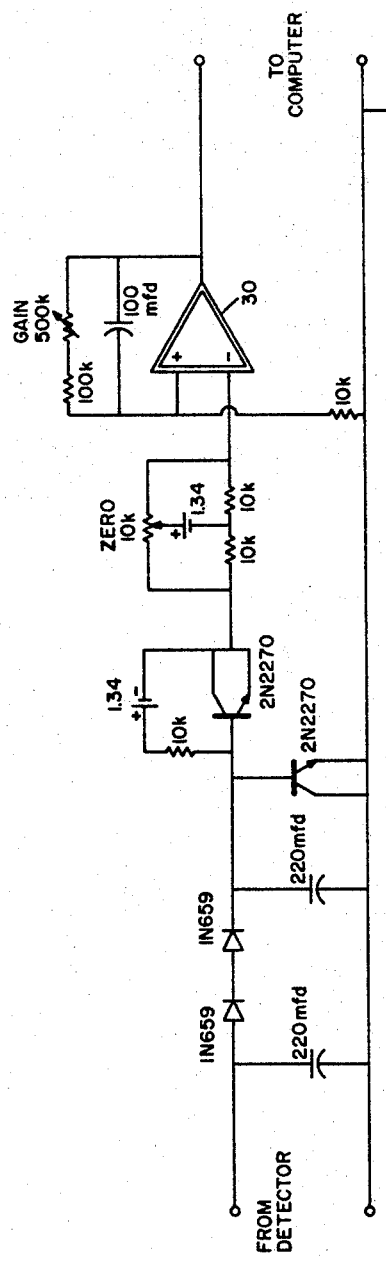
Figure 5:
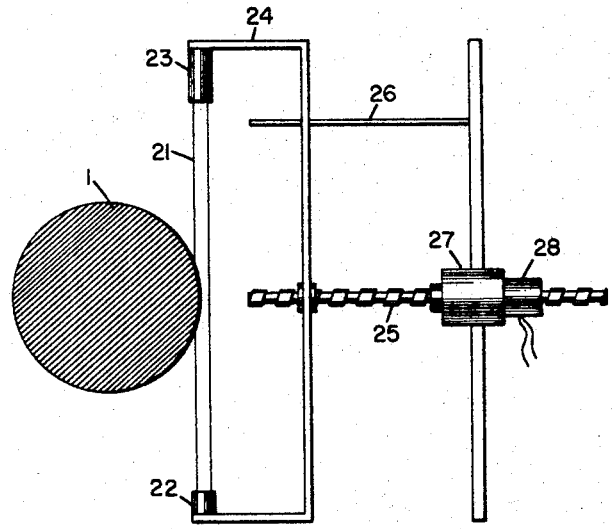
FIGURES 5 and 6 illustrate the mechanical portions and FIGURE 7 illustrates the electrical circuitry of the optical calipers utilized in preferred embodiments of the present invention.
Figure 6:
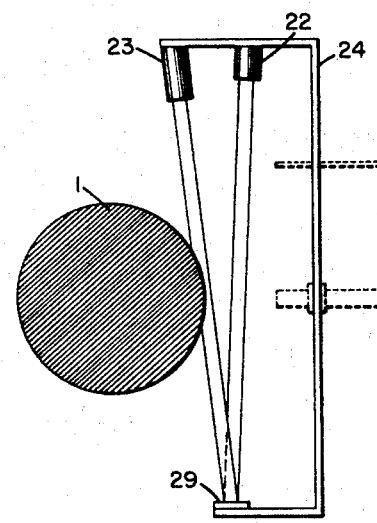
Figure 7:
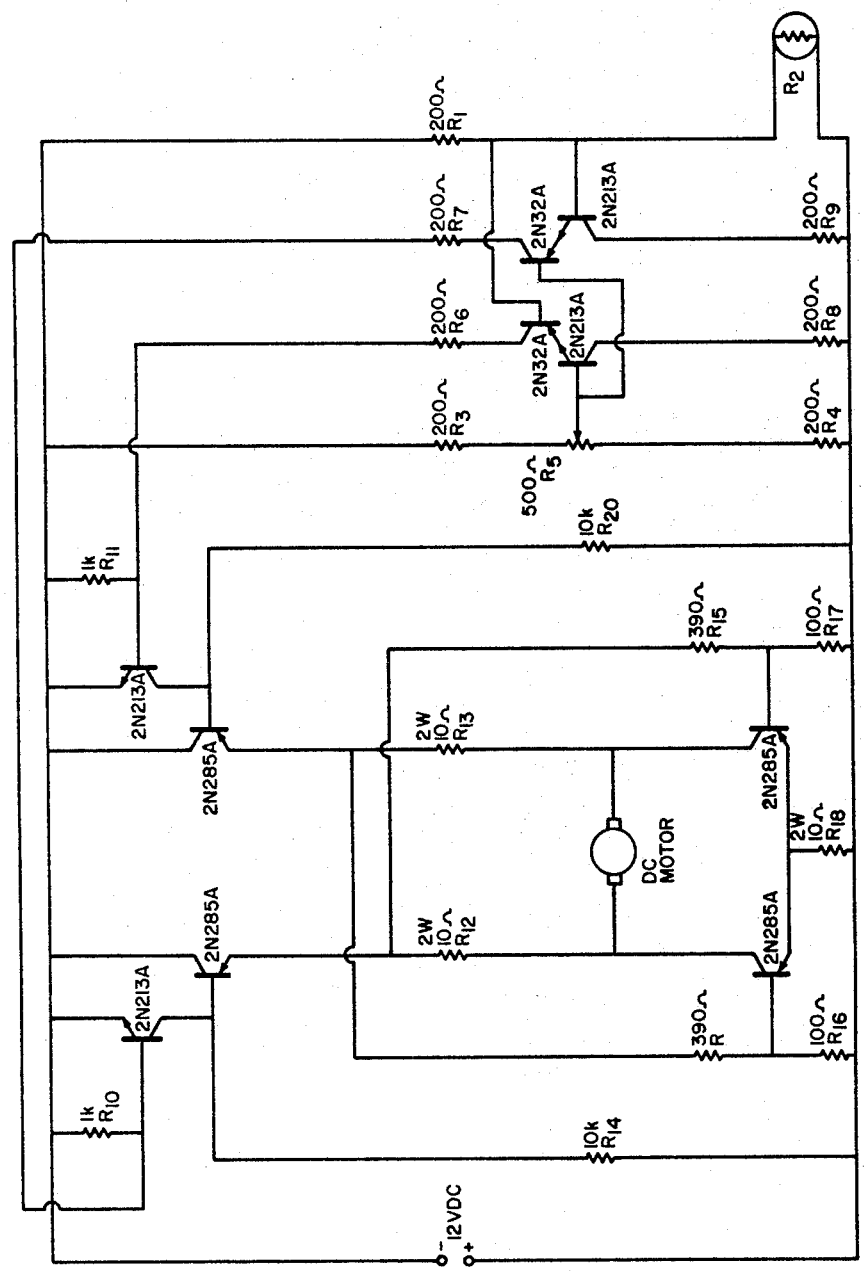

FIGURE 4 illustrates the circuitry of a preferred log rate meter 8. In operation, the scintillation detector 7 transmits a signal which is proportional to the intensity of the radiation to the log rate meter 8 which in turn transmits a signal which is proportional to the logarithm of the intensity of the radiation to the computer 9. In the computer the log intensity signal enters an adder-subtracter 13 where the background radiation is corrected for by algebraically adding the output signal from a potentiometer 11 manually adjusted to zero the output from adder 13 when no core is in the apparatus. The corrected log intensity signal is then transmitted to a divider 17 such as the type 19–302 multiplier/divider

that the maximum thickness occurs at the point through which the radiation passes. Then the optical calipers will be measuring the thickness at the point where the opacity to radiation is being measured. For most core specimens such dressing will not be necessary.

It will be understood that the subject invention is adaptable to a wide variety of variations all of which are to be considered as being within the scope of the invention. The above preferred embodiment is not to be taken to limit the invention in any manner or to any degree.

What is claimed is:

1. A radiation measuring device for determining opacity to radiation per unit of thickness of objects which may vary in thickness comprising in combination, means for projecting a relatively narrow beam of radiation through said objects, said beam entering said object at a first point and emerging from said object at a second point on a substantially opposing side of said object so that said beam has two points of intersection with the exterior of said object at every instant, radiation measuring means for measuring the intensity of the radiation passing through said objects, measuring means for measuring the thickness of said objects at the points through which said radiation passes comprising means for projecting a beam of light so that said beam is partially intersected by the exterior surface of said objects at substantially a same point as is said point of intersection of said beam of radiation at the same instant, said beam of light and said beam of radiation both lying substantially in a single plane, means for moving said object relative to said beams in a direction substantially transverse to said plane in which said beams of light and radiation lie, computing means for compiling the outputs from said radiation detector and said thickness measuring device to directly indicate a variable which is dependent on the opacity to radiation per unit thickness of the object, whereby both the thickness and the opacity to radiation of the objects are measured at each point along an axis of the object as the object is fed through said narrow beam of radiation.

2. The device of claim 1 wherein said measuring means includes means for projecting two beams of light, each of which is partially intercepted by the exterior surface of said object at substantially the same two points on said exterior surface as are simultaneously intercepted by said beam of radiation.

3. The device of claim 1 wherein the dependent variables comprise porosity of the object.

4. The device of claim 1 wherein the dependent variables comprise density of the object.

5. The device of claim 1 wherein provision is made for the insertion into the computer of a value relating to the matrix density and wherein the dependent variable is porosity.

6. The device of claim 1 wherein the dependent variable is integrated over the axis of the specimen in order to determine the average value over said axis.

References Cited

UNITED STATES PATENTS

| 2,812,685 | 11/1957 | Vossberg | 88—14 |
| 2,922,887 | 1/1960 | Jacobs | 250—83.3 |
| 3,066,254 | 11/1962 | Price et al. | 324—37 |
| 3,080,479 | 3/1963 | Berg et al. | 250—71.5 |
| 3,136,892 | 6/1964 | Willett et al. | 250—83.3 |

FOREIGN PATENTS 847,129   9/1960   Great Britain.

ARCHIE R. BORCHELT, *Primary Examiner.*

RALPH G. NILSON, *Examiner.*

S. ELBAUM, *Assistant Examiner.*